US008719627B2

(12) United States Patent
Watson et al.

(10) Patent No.: US 8,719,627 B2
(45) Date of Patent: May 6, 2014

(54) CROSS-CLOUD COMPUTING FOR CAPACITY MANAGEMENT AND DISASTER RECOVERY

(75) Inventors: Eric B. Watson, Redmond, WA (US); Alireza Farhangi, Kirkland, WA (US); Kannan C. Iyer, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 354 days.

(21) Appl. No.: 13/111,953

(22) Filed: May 20, 2011

(65) Prior Publication Data

US 2012/0297238 A1 Nov. 22, 2012

(51) Int. Cl.
*G06F 11/00* (2006.01)
(52) U.S. Cl.
USPC .......................................................... 714/13
(58) Field of Classification Search
USPC ........... 714/6.31, 6.32, 10–16, 18, 20, 25, 31, 714/38.1, 39, 48, 49
See application file for complete search history.

(56) References Cited

U.S. PATENT DOCUMENTS

| | | | |
|---|---|---|---|
| 7,698,113 B2 * | 4/2010 | Steinbach et al. ................. 703/2 |
| 7,900,206 B1 * | 3/2011 | Joshi et al. ..................... 718/104 |
| 8,117,487 B1 * | 2/2012 | Raut et al. ..................... 714/4.11 |
| 8,301,700 B1 * | 10/2012 | Havemose .................... 709/205 |
| 2004/0073639 A1 * | 4/2004 | Basoglu et al. ............... 709/223 |
| 2009/0055507 A1 * | 2/2009 | Oeda ............................. 709/216 |
| 2009/0300210 A1 | 12/2009 | Ferris |
| 2010/0268764 A1 | 10/2010 | Wee et al. |
| 2010/0287263 A1 * | 11/2010 | Liu et al. ........................ 709/221 |
| 2011/0029880 A1 * | 2/2011 | Neuse et al. ................... 715/735 |
| 2011/0282982 A1 * | 11/2011 | Jain ............................... 709/223 |

OTHER PUBLICATIONS

"International Search Report", Mailed Date: Nov. 28, 2012, Application No. PCT/US2012/038642, Filed Date: May 18, 2012, pp. 11.
"Failover & Load Balancing", Retrieved at << http://www.vmware.com/technical-resources/high-availability/load-balancing.html>>,Retrieved Date : Dec. 21, 2010, p. 1.
"What is Razor Servers Cloud Computing?", Retrieved at <<http://www.razorservers.com/the-cloud>>, Retrieved Date : Dec. 21, 2010, pp. 4.
"Nimbo—Cloud Enablement Platform", Retrieved at <<http://www.hcltech.com/cloud-computing/Nimbo/>>,Retrieved Date : Dec. 21, 2010, pp. 2.

(Continued)

*Primary Examiner* — Nadeem Iqbal
(74) *Attorney, Agent, or Firm* — Ben Tabor; Kate Drakos; Micky Minhas

(57) ABSTRACT

A cloud migration system is described herein that provides capacity management and disaster recovery by detecting peak load conditions and automatically moving computing to another computing resource (and back) and by providing computing across two or more clouds and moving completely to one in the case of a disaster at one site. The system monitors loads within a datacenter and detects a threshold that indicates that the current load is nearing the datacenter's capacity. Upon detecting that the threshold will be reached, the system facilitates an orderly move of at least some datacenter load to another datacenter or cloud-based resources. The system can also be used as a disaster recovery architecture at a datacenter/network level to manage fast workload transition in case of disaster. Thus, the system allows enterprises to build smaller and more efficient datacenters that leverage other resources for rare extra loads.

20 Claims, 4 Drawing Sheets

(56) References Cited

OTHER PUBLICATIONS

"3Par Multipath I/O for Microsoft Windows", Retrieved at <<http://www.3par.com/SiteObjects/CF3BA33B7B8D1E3D61E79EA96C9F742E/3PAR-mpio-ds-08.0.pdf>>, 2008, p. 1.

VMware vCenter CapacityIQTM Retrieved at << http://www.vmware.com/files/pdf/VMware-vCenter-CapacityIQ-DS-EN.pdf>>, 2009, pp. 2.

"Cloud Balancing: The Next Generation of Global Server Load Balancing", Retrieved at <<http://virtualizationreview.com/blogs/app-delivery-ondemand/2010/06/cloud-balancing.aspx>>, Retrieved Date : Dec. 21, 2010, pp. 3.

Wininger, Rick, "Capacity Management in VMware Virtualized Infrastructures", Retrieved at <<http://edge.networkworld.com/documents/whitepaper/CapacityManagement.pdf>>, Retrieved Date : Dec. 21, 2010, pp. 13.

* cited by examiner

CROSS-CLOUD COMPUTING FOR CAPACITY MANAGEMENT AND DISASTER RECOVERY

BACKGROUND

Datacenters provide servers for running large applications. Enterprises often use datacenters to run core business functions such as sales, marketing, human resources, billing, product catalogs, and so forth. Datacenters may also run customer-facing applications, such as web sites, web services, email hosts, databases, and many other applications. Datacenters are typically built by determining an expected peak load and providing servers, network infrastructure, cooling, and other resources to handle the peak load level. Datacenters are known for being very expensive and for being underutilized at non-peak times. They also involve a relatively high management expense in terms of both equipment and personnel for monitoring and performing maintenance on the datacenter. Because almost every enterprise uses a datacenter of some sort, there are many redundant functions performed by organizations across the world.

Cloud computing has emerged as one optimization of the traditional datacenter. A cloud is defined as a set of resources (e.g., processing, storage, or other resources) available through a network that can serve at least some traditional datacenter functions for an enterprise. A cloud often involves a layer of abstraction such that the applications and users of the cloud may not know the specific hardware that the applications are running on, where the hardware is located, and so forth. This allows the cloud operator some additional freedom in terms of rotating resources into and out of service, maintenance, and so on. Clouds may include public clouds, such as MICROSOFT™ Azure, Amazon Web Services, and others, as well as private clouds, such as those provided by Eucalyptus Systems, MICROSOFT™, and others. Companies have begun offering appliances (e.g., the MICROSOFT™ Azure Appliance) that enterprises can place in their own datacenters to connect the datacenter with varying levels of cloud functionality.

Enterprises with datacenters incur substantial costs building out large datacenters, even when cloud-based resources are leveraged. Enterprises often still planned for "worst-case" peak scenarios and thus include an amount of hardware at least some of which is rarely used or underutilized in terms of extra processing capacity, extra storage space, and so forth. This extra amount of resources incurs a high cost for little return. Customers using cloud based computing on premise expect to be able to use capacity in another compatible cloud (e.g., a second instance of their own in another location, Microsoft's public cloud, and so forth) for peak capacity times, for disaster recover scenarios, or just for capacity management. Doing so is much less expensive than building out for the worst-case scenario and then doubling for redundancy.

SUMMARY

A cloud migration system is described herein that provides capacity management and disaster recovery by detecting peak load conditions and automatically moving computing to another computing resource (and back) and by providing computing across two or more clouds and moving completely to one in the case of a disaster at one site. This allows enterprises to plan for local resources for a sustained level of load and to leverage cloud-based resources for peak or other unusual loads. The cloud migration system monitors loads within a datacenter and detects a threshold that indicates that the current load is nearing the datacenter's capacity. Upon detecting that the threshold will be reached, the cloud migration system facilitates an orderly move of at least some datacenter load to another datacenter or cloud-based resources. The system can also be used as a disaster recovery architecture at a datacenter/network level to manage fast workload transition in case of disaster. If a datacenter resource permanently fails, the system can quickly and efficiently migrate additional load to the cloud or other resources. Thus, the cloud migration system allows enterprises to build smaller and more efficient datacenters that leverage other resources for rare extra loads.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
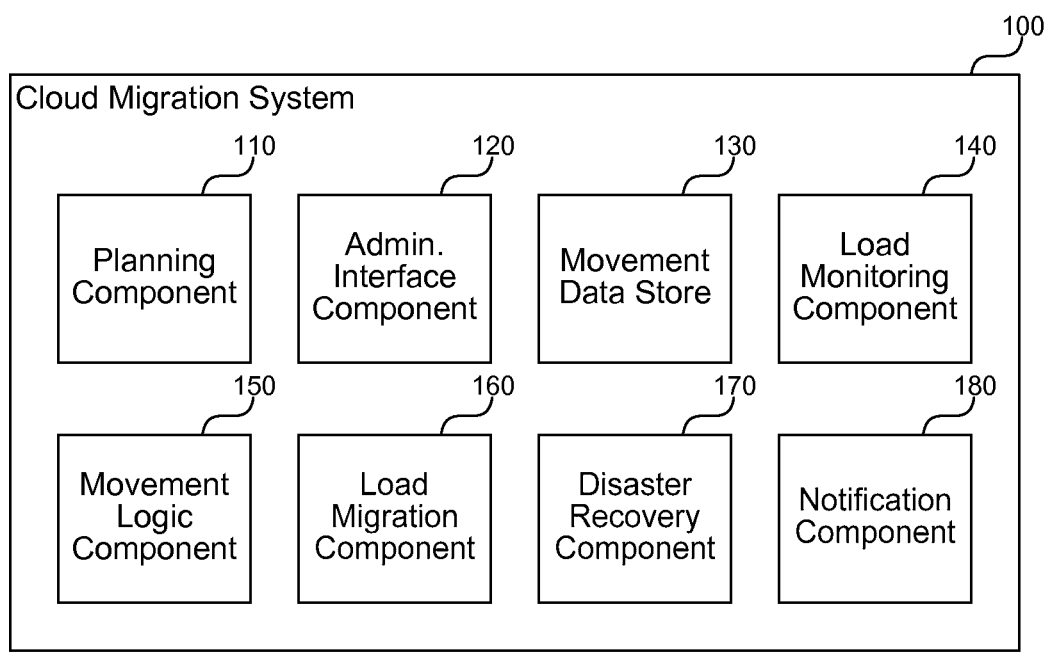
FIG. 1 is a block diagram that illustrates components of the cloud migration system, in one embodiment.

A cloud migration system is described herein that provides capacity management and disaster recovery by detecting peak load conditions and automatically moving computing to another computing resource (and back) and by providing computing across two or more clouds and moving completely to one in the case of a disaster at one site. This allows enterprises to plan for local resources for a sustained level of load and to leverage cloud-based resources for peak or other unusual loads. In many cases, an enterprise's business is such that a particular time of year is busier than others, and extra resources may only be needed during those times. For example, tax-planning enterprises are particular busy in mid-April, e-commerce sites experience holiday rushes around Thanksgiving and Christmas, and so on. The cloud migration system monitors loads within a datacenter and detects a threshold that indicates that the current load is nearing the datacenter's capacity. For example, the system may monitor central processing unit (CPU) usage, memory usage, storage usage, network bandwidth, and other metrics to determine how well the datacenter is handling the current load. The system may also observe trends (e.g., a rate of acceleration of resource usage) to determine whether the threshold has been or will soon be reached.

Upon detecting that the threshold will be reached, the cloud migration system facilitates an orderly move of at least some datacenter load to another datacenter or cloud-based resources. For example, the system may migrate some peak load to a public cloud. Because cloud pricing models may vary, the system may factor cost into the decision. For example, the system may prefer to host as much load as possible at the enterprise datacenter to reduce cost, while leveraging cloud resources only to the extent needed to satisfy client requests. The system may also provide management and monitoring tools that provide a consistent experience for information technology (IT) personnel regardless of where particular loads are run (e.g., locally within the enterprise or publicly using a cloud). The system may also provide planning tools to help decide appropriate workloads or applications for moving to other resources during high loads. For example, applications may have various compliance/regulatory or networking/design limitations that make them more or less suitable for migration. The system can also be used as a disaster recovery architecture at a datacenter/network level to manage fast workload transition in case of disaster. If a datacenter resource permanently fails, the system can quickly and efficiently migrate additional load to the cloud or other resources so that clients of the datacenter are unaffected or are less affected by the failure. Thus, the cloud migration system allows enterprises to build smaller and more efficient datacenters that leverage other resources for rare extra loads.

As described above, the cloud migration system may move resources between a datacenter and the cloud on a temporary (i.e., bursting) or permanent (i.e., disaster recovery) basis. Temporary movements include bursting an application or other load for a short time period to handle a peak or other high load that exceeds the datacenter's capacity. A temporary movement may include bursting an entire application or splitting the application's load across two or more locations. Permanent movements include longer-term migration of loads due to a failure of hardware in the datacenter, a more sustained increase in capacity needs, a desire to distribute an application globally with dynamic load balancing, and so forth. Following are several example scenarios in which the system may be used by an enterprise.

In the first example, an enterprise bursts application load to a public cloud to manage capacity. The business decision maker (i.e., CEO, CFO, or VP Marketing/sales) and datacenter systems administrator decide it would be more cost effective and provide a more satisfactory customer experience to burst some work to the public cloud at their top three peak day level of use/traffic per year, and maintain their own datacenter (potentially with a cloud appliance) at their peak monthly usage level. They sign business agreements with the cloud provider to burst work into the cloud and project estimates of when and how much work that would be. Their account is set up and the information entered into the cloud appliance. During a planning phase, the administrator runs a test with a test application from the cloud provider that ensures the connection is working properly. The administrator then sets the capacity values (e.g., threshold) for initiating bursting of applications that keep capacity at the specified level in a capacity management tool. The administrator goes into the tool to further specify the applications that are eligible to move in this situation (e.g., no regulatory issues with temporary movement, good technical fit).

The day comes when use exceeds the limits and the system automatically moves applications to the public cloud. Alerts are thrown in the monitoring/usage systems when capacity is within 5% of the bursting being initiated, when the system does burst, what the system bursts, and when the system brings the applications back. An explicit log is kept of all compute resources and/or storage moved and the administrator is alerted to go to their public cloud account for billing. A review of the bursting parameters and applications tagged as movable is reviewed in the regular capacity planning meetings with in the enterprise datacenter group and management.

In a second example, an enterprise splits applications across clouds to manage capacity. This scenario is similar to the scenario above except for the type of application moved is more complex, so is split out to prioritize differently. The company decides to have a relationship with the cloud provider for splitting applications into the cloud (a form of bursting). In this case, a large application was pre-identified as a bursting candidate. When the capacity reaches the threshold, 50 of the 100 worker instances are automatically moved to the public cloud. The application is now split across two instances, with all monitoring and billing data being sent to the starting instance so it can be centrally managed. A cloud appliance in the enterprise's own datacenter has troubleshooting tools to help debug possible issues of split applications (e.g., networking issues, network bandwidth/latency issues, fabric communication, and so on). When the capacity situation has subsided on the appliance, the 50 worker instances are moved back to the appliance and it is a normally functioning application again.

In another example, a cloud provider decides to burst from one cluster to another. The public cloud capacity planning team decides that a cluster in the Chicago datacenter is critically full but wants to maintain high utilization. They set up bursting to an underutilized cluster in a West coast datacenter when utilization gets to 90%. The administrator goes into the capacity management tool and chooses appropriate customers/applications (e.g., with low data usage) to be move candidates. The day comes when the usage of the Chicago cluster reaches the threshold and the system automatically moves the selected applications (e.g., 10% of the cluster's apps) to the West coast datacenter for one day. As usage returns below the threshold, the system moves the applications back to Chicago. The system notifies a designated monitoring team proactively of the burst to be able to answer customer questions.

In another example, the system is used for cross-cloud portfolio management. An enterprise decides that to manage capacity efficiently on their cloud appliance, they want to put all variable demand apps in a public cloud and their constant demand applications in the appliance or local datacenter resources (and thus be able to run the appliance at higher utilization). While they want their computing resources split, they still want a global view across all of their application's health, to have their application developers manage applications the same way, and to maintain a single view of departmental billing across both (e.g., what costs to allocate to the consumer sales groups, internal IT, B2B sales, and so forth). The enterprise is able to set up the aggregation accounts with the public cloud with the same groups as the appliance and get billing data to integrate on their side. Similarly, they are able to get application-programming interface (API) access to the public cloud monitoring data for the platform their apps are running on as well as application level monitoring, so their network operation center (NOC) has a complete and consistent view of the state of the computing activity of the enterprise.

In another example, an enterprise sets up a globally distributed application with dynamic load balancing. An enterprise customer wants to manage capacity across two or more cloud instances and has a significant amount of their load in independent but geographically distributed instances (e.g., Bing search with a US and UK datacenter that both serve German queries). Under normal circumstances, a global traffic manager sends 50% traffic to each location. When load gets high at the primary location, the system instructs the load balancer to send 75% of the traffic to the UK system, thus freeing up capacity from the US cloud instance, bringing it to acceptable levels. When capacity returns to normal, the system tells the load balancer to return to the 50/50 split. A variation of this is for the public cloud to be used as a secondary datacenter (with say 1% of load, the customer's site with the appliance to be the other 99%). In the case of a disaster or other reason to move load from the customer's site, 100% of traffic is shifted to the public cloud.

In another example, an enterprise has reached its datacenter's capacity and needs extra computing resources, but does not yet have the available capital to expend to expand the datacenter. In this case, the company can use a public cloud for spillover until they can get the hardware purchase completed.

FIG. 1 is a block diagram that illustrates components of the cloud migration system, in one embodiment. The system 100 includes a planning component 110, an administrative interface component 120, a movement data store 130, a load monitoring component 140, a movement logic component 150, a load migration component 160, a disaster recovery component 170, and a notification component 180. Each of these components is described in further detail herein.

The planning component 110 provides a tool through which an administrator defines one or more conditions for migrating application load to a cloud-based computing resource. The component 110 may include a capacity management tool through which an administrator can specify a threshold load at which migration occurs, the location or resources to which migration occurs, how applications are partitioned across available resources, and so forth. For example, an administrator may specify for migration to occur to a public cloud when an application's load reaches 95% of local datacenter capacity. The tool may also include a facility for simulating and/or testing example server loads so that the administrator can test what will happen when capacity is reached.

The administrative interface component 120 provides an administrative interface to the system 100 through which an administrator can access tools and configuration settings, such as those provided by the planning component 110. The administrative interface may include one or more web pages, web services, application-programming interfaces, or other interfaces through which an administrator can directly or programmatically access administrative configuration of the system 100.

The movement data store 130 stores information describing received conditions for migrating application load to the cloud-based computing resource. The data store 130 may include one or more files, file system, hard drives, databases, cloud-based storage services, or other facilities for persisting information between sessions with the system 100. The stored information may include threshold application load levels, which applications to migrate, where to migrate moved loads, cost information related to where loads can be moved, and any other information related to capacity planning and making a load migration decision under various conditions.

The load monitoring component 140 monitors performance in a datacenter and informs other components when a load is approaching a specified condition for migration to another resource. The load monitoring component may provide reporting and status information through the administrative interface component 120 that allows an administrator or other IT personnel to monitor application and datacenter behavior in real time. The system may provide one or more performance graphs, threshold alerts, or other notifications to inform personnel when application loads exceed or are near a specified threshold. Thresholds may be defined by an administrator in terms of processing load, storage load, memory load, or other finite resources of the datacenter that a particular application may exceed during peak times.

The movement logic component 150 carries out the received conditions for migrating an application load. The movement logic component 150 receives notification from the load monitoring component 140 that specifies current system 100 load and uses this information to determine when a migration will occur. The movement logic component 150 adheres to the conditions specified by an administrator that may specify how much of the load to move to another resource, which type/location of resources to migrate to, under what conditions to migrate the load back, and so on. The movement logic component 150 monitors the migration and may perform testing of networking connections that are setup for communication between the datacenter and cloud-based resources. The component 150 also monitors the load to determine when cloud-based resources are no longer needed, due to the load subsiding. In many cases, cloud-based resources are provided on a pay-per-use basis, such that it may be desirable to cease using cloud-based resources once the datacenter can again handle the load in order to reduce cost.

The load migration component 160 performs the movement of application loads from one resource to another. This may include setting up networking connections between the two resources, replicating stored data needed for the application to run, copying data as it is modified at each resource location, and so forth. To run an application at multiple locations, there may be shared data that is read, written, or both by the application. In cases where the data is read, it may be sufficient for the component 160 to copy the data to both locations. In cases where data is read and written, the system may replicate data on an ongoing basis between locations. In many cases, the application's use of data will inform the planning phase of the decision of which applications are suitable for migration. In some cases, an application's processing load may be suitable for migration, but all instances may access the same data storage location due to difficulty of having the data located in two places. These decisions vary by application and are part of the information provided by the administrator through the planning component 110. At migration time, the system 100 can select among available applications for migration to move one or more applications that will appropriately reduce the load in the datacenter to a manageable level without compromising the application's correct operation.

The disaster recovery component 170 detects failure of one or more resources and invokes the load migration component 160 to move loads from the failed resources to one or more new resources. For example, the disaster recovery component 170 may detect a failure of an appliance instance running on a cloud appliance in a datacenter and move applications running on that appliance instance to a public cloud so that the applications continue to function. This gives the datacenter administrator time to replace the failed appliance instance or to setup the application to run in the public cloud on a more permanent basis. In the meantime, application clients are not blocked from using the application and the application continues to function. The component 170 may include a centralized service running at a common location or a distributed service that has multiple disparate components running on distributed instances monitoring and communicating a heartbeat. The disaster recovery component 170 may detect a variety of processing, storage, memory, or other failures and move applications or parts of applications as needed to relocate dependencies on the failed resources.

The notification component 180 notifies an administrator of application migration performed by the system 100. The component 180 may send an email, text message, or other communication to one or more IT personnel upon the occurrence of one or more events. The events may include application loads that are nearing a defined threshold, bursting application load to a remote cloud resource, detection of a failure of a hardware component, disaster recovery to cloud based resources, and other events defined by users of the system 100 through the administrative interface component 120.

The computing device on which the cloud migration system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
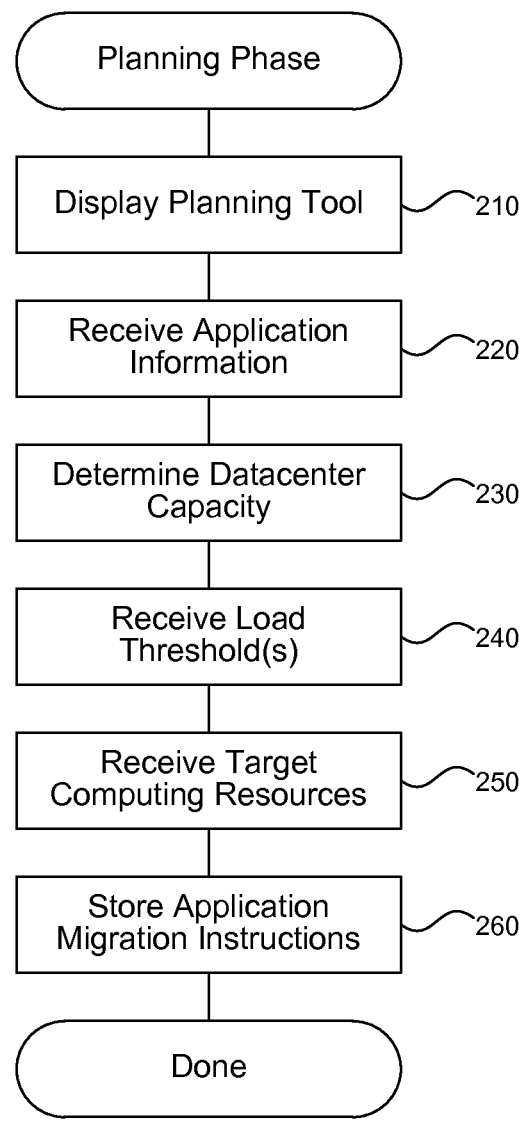
FIG. 2 is a flow diagram that illustrates processing of the cloud migration system to receive planning information for a future load migration, in one embodiment.

FIG. 2 is a flow diagram that illustrates processing of the cloud migration system to receive planning information for a future load migration, in one embodiment. Beginning in block 210, the system displays a planning tool through which an administrator can provide application information that defines one or more conditions for moving an application load from a source datacenter computing resource to a target datacenter computing resource. The target resource may include one or more cloud-based services, other datacenters, and so forth. The planning tool allows the administrator to define when and how applications will be moved, including indicating how much load will trigger a migration and which applications are suitable (or not suitable) for relocation. Applications may have data, networking, or other constraints that determine how easy or difficult it is to move them or locate multiple instances of the application at separate locations. The planning tool may also receive billing information that allows the administrator to factor cost of various target resources into the decision of when and how to move application loads.

Continuing in block 220, the system receives application information that describes one or more applications that are currently executed on the source computing resource and can be relocated wholly or partly to the target computing resource. The application information may identify application binaries, data, configuration, and other information that is used to successfully run the application, so that the system can migrate all of an application's related information upon a decision to migrate the application. Some applications may be unsuitable or less suitable for migration (e.g., due to extensive shared data) and the system may receive priority information that specifies an order in which to migrate applications and/or a list of applications not to migrate.

Continuing in block 230, the system determines one or more capacity metrics of the source datacenter computing resource. The metrics may include processing capacity, storage capacity, memory capacity, networking bandwidth, and other measures of finite resources available in the source datacenter that determine a quantity of application load the datacenter can handle. The determined capacity may also include information about typical load of each application that correlates client request load with application demands for resources within the datacenter. In this way, when the system observes metrics above a defined threshold, the system can automatically determine that a migration of part or all of an application load is needed to stay within available datacenter capacity.

Continuing in block 240, the system receives one or more load thresholds that indicate a load at which application load migration will automatically occur. The threshold may be in terms of processor utilization, storage capacity, memory usage, network bandwidth, or any other metric that indicates a potential exhaustion or near exhaustion of one or more datacenter resources. Ideally, the threshold is selected so that there is time to complete a migration before any resource is fully consumed so that client requests are uninterrupted. Administrators may strike a balance between an early move that potentially incurs more cost for external computing resources, and a late move that does not move in time to satisfy all client requests.

Continuing in block 250, the system receives an identification of one or more target computing resources to utilize to offload excess application load upon reaching the defined load thresholds. The identification may include a particular public cloud, geographic datacenter location, server addresses of a private datacenter, or other identification of a target computing resource to which to migrate application load. In some cases, the system may receive billing, time of day, or other information that facilitates a decision between multiple available target computing resources.

Continuing in block 260, the system stores application migration instructions that include the received load threshold and one or more identified target datacenter computing resources to which to migrate application load upon reaching the threshold. The instructions may identify a particular other datacenter, public cloud, private cloud, or other resources to which to move application loads when the threshold is reached. After block 260, these steps conclude.

Figure 3:
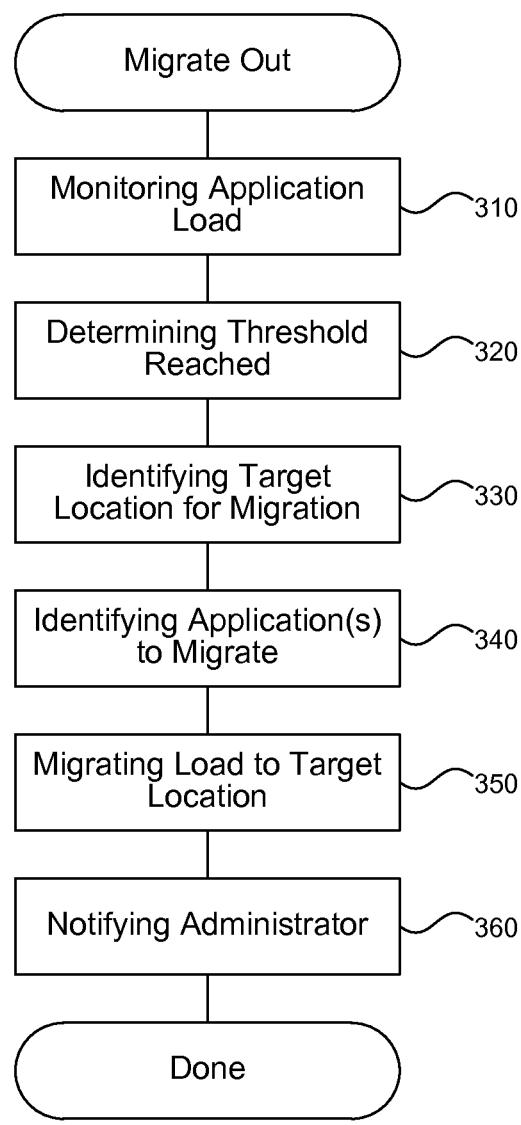
FIG. 3 is a flow diagram that illustrates processing of the cloud migration system to migrate application load from a data center to a target location, in one embodiment.

FIG. 3 is a flow diagram that illustrates processing of the cloud migration system to migrate application load from a data center to a target location, in one embodiment. Beginning in block 310, the system monitors an application running on one or more computing resources in a datacenter to determine an ongoing application load. Monitoring may include measuring various indications of performance of the application, such as operating system performance counters, information provided by the application, and other information available for determining the condition of the running application.

Continuing in block 320, the system determines based on monitoring that a threshold for migrating the application to another computing resource has been reached. The threshold is set by an administrator during a previously completed planning phase such as that described with reference to FIG. 2. The threshold may include metrics tied to processor usage, memory usage, client requests per second, storage usage, or other indications of application load. The administrator may choose a threshold before capacity is fully exhausted, such as 90% of available resources, as an appropriate threshold to begin migration of application load to another resource. In some embodiments, determining that the threshold has been reached includes determining that a failure has occurred in the source datacenter and performing disaster recovery to move application loads affected by the failure to the target computing resource.

Continuing in block 330, the system identifies a target computing resource to which to migrate at least some of the running application's load. The target resource may be specified during the planning phase by an administrator or may be dynamically determined based on one or more possible target locations to which to migrate the load. In some cases, the decision may be based on time of day or other factors that affect a cost of offloading loads to another location. For example, during peak time in the U.S. the system may migrate loads to a datacenter in Japan that is operating during off-peak (and thus lower cost) hours.

Continuing in block 340, the system identifies one or more applications to migrate. In some cases, the system may migrate multiple applications, depending on the present loads, available capacity, specified thresholds, and so on. As described with respect to the planning phase herein, an administrator may indicate which applications are suitable for migration and a prioritized order in which the system will migrate applications. For example, the system may select which applications to migrate by determining data usage of one or more applications and determining which applications can be moved with a least burden of data replication to the target location.

Continuing in block 350, the system migrates at least some application load of the identified applications to the identified target computing resource. Migration may include setting up network connectivity to databases or other application resources, copying data from the source location to the target location, setting up ongoing data mirroring, testing communication between the two sites, and so forth. The system may also monitor bandwidth and other metrics between the two locations so that any drop in health of the connection can be mitigated, potentially with further migrations.

Continuing in block 360, the system notifies an administrator or other IT personnel describing the reached threshold and actions taken to migrate application load. The administrator can use this information to confirm that the migration was successful in maintaining application loads within the capacity of the source datacenter. The administrator may also take additional manual actions, such as selecting additional applications for migration in advance of a predicted increase in client requests. After block 360, these steps conclude.

Figure 4:
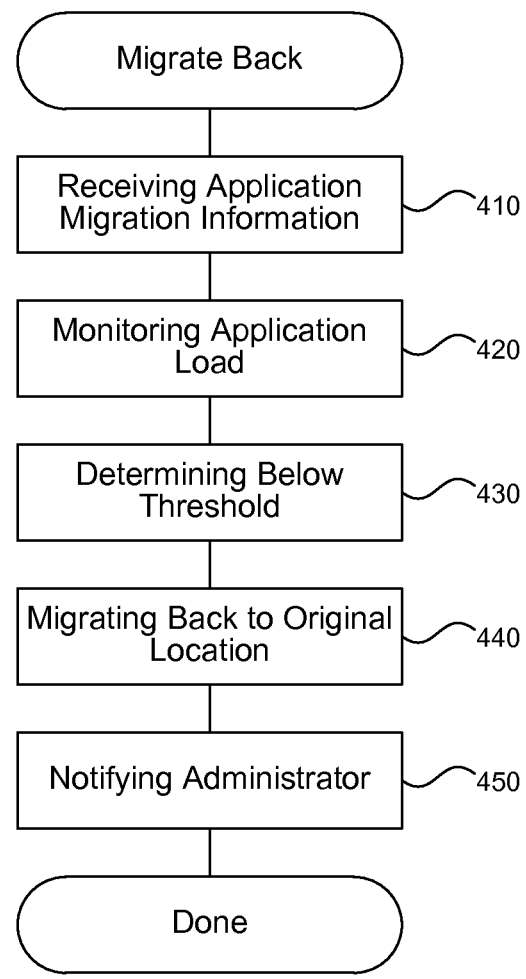
FIG. 4 is a flow diagram that illustrates processing of the cloud migration system to migrate application load back to its original location following a reduction in load, in one embodiment.

FIG. 4 is a flow diagram that illustrates processing of the cloud migration system to migrate application load back to its original location following a reduction in load, in one embodiment. Beginning in block 410, the system receives application migration information that describes one or more conditions under which to move an application load from a source computing resource to target computing resource and back again. The information may specify one or more thresholds of computing resource capacity that indicate when to perform each type of move. For example, the information may specify migration of application load from a private datacenter to a public cloud when the private datacenter reaches 90% of available capacity and migration back to the private datacenter when the load falls below 80% of available capacity. In this way, the operator of the datacenter can design the datacenter to handle common load levels and use a public cloud or other datacenter for handling peak or unexpected load levels.

Continuing in block 420, the system monitors an application running on the source computing resource to determine an ongoing application load. Monitoring may include measuring various indications of performance of the application, such as operating system performance counters, information provided by the application, and other information available for determining the condition of the running application.

Continuing in block 430, the system determines that a previously migrated application load is below a threshold for migrating application load back to the source computing resource where it originally resided. The threshold is set by an administrator during a previously completed planning phase such as that described with reference to FIG. 2. The threshold may include metrics tied to processor usage, memory usage, client requests per second, storage usage, or other indications of application load. The administrator may choose a threshold or duration below threshold that indicates that further need of the external computing resources is unlikely, such as an hour of sustained use of less than 80% of the source computing resource capacity.

Continuing in block 440, the system migrates the application back to the original source computing resource. Migration may include copying data from the target location back to the source location, tearing down previously established networking connections or data mirroring between the two locations, and so forth. In some embodiments, the system may leave established connections and mirrored data in place so that future migrations can occur with less delay.

Continuing in block 450, the system notifies an administrator or other IT personnel describing the reached threshold and actions taken to migrate application load. The system may also report to the administrator any anomalies noted or whether there have been excessive migrations back and forth resulting in a ping-pong effect. The administrator can use this information to confirm that the migration was successful in maintaining application loads within the capacity of the source datacenter. The administrator may also take additional manual actions, such as determining whether to keep established connections with the target computing resource in place or to override a previously configured action to prevent migrations back and forth endlessly. After block 450, these steps conclude.

In some embodiments, the cloud migration system migrates application load by modifying domain name service (DNS) records. The system may modify a DNS server to point incoming client requests to one or more new destination Internet Protocol (IP) addresses to direct loads away from a source datacenter over to a target datacenter/cloud. A global traffic manager (GTM) often points clients to the nearest server for handling their requests, and these solutions can be modified to redirect traffic based on load or other conditions. Thus, when one datacenter becomes overloaded or near capacity, the cloud migration system may inform the GTM to direct at least some client requests to a new location that can handle the excess load.

In some embodiments, the cloud migration system migrates log and other data back from the target computing resources after migration conditions have eased. For example, following a period of peak load, the system may migrate all application loads back to the original datacenter, and may pull information generated at the target datacenter, such as application logs, back to the original datacenter for later analysis. For some applications, tracking client requests may be a matter of regulatory compliance or simply useful for debugging and reporting. In either case, consolidating the logs at the source location may be part of a successful migration back to the source location.

In some embodiments, the cloud migration system allocates a dynamically variable amount of application load between a source computing resource and one or more target computing resources. For example, the system may dynamically route requests to keep the source computing resource at or near full capacity and only send requests out to external computing resources that the source computing resource could not successfully handle. Such decisions may be a matter of cost, data safety, or other considerations to migrate out as little application load as needed or to place application loads where they can be performed cheapest or most efficiently.

In some embodiments, the cloud migration system adds a step of administrator acknowledgement into the application migration process. For example, the system may notify an administrator upon determining that capacity at a datacenter is nearing exhaustion, but may wait for administrator acknowledgement to perform a migration. Along with the acknowledgment, the administrator may select among multiple options for where to migrate the load, and may make decisions based on cost or other factors. After receiving the acknowledgement from the administrator, the system can automatically perform the migration as described previously.

In some embodiments, the cloud migration system provides various options for disaster recovery. In some cases, the system may enlist resources at an external datacenter to monitor a main datacenter for outages. If the external datacenter becomes unable to reach the main datacenter, then the external datacenter may determine that a disaster has occurred and move application loads to the external datacenter. In past systems, it was typical for an organization to maintain 200% of needed capacity (at substantial expense) in order to successfully handle disasters. With the cloud migration system, the organization can maintain a lower amount of available capacity at a second location (e.g., 10%) and can rapidly request more as needed in the event of a failure. Much like insurance, the likelihood of all clients of a cloud provider failing at the same time and requesting a high capacity spare is low, such that multiple clients can share a set of redundant secondary resources to be used in the event of failure of primary resources.

In some embodiments, the cloud migration system migrates application load based on off-peak pricing. There is some elasticity in demand for cloud computing resources in customer scenarios. Some customer segments just need a certain amount of computing capacity, but have flexibility in when they access that capacity to run their jobs—high-performance computing (HPC) and batch processing are two good examples. The system may provide a job scheduling tool through which an administrator can specify where and when application loads will run to lower cost and leverage off-peak rates for eligible application loads.

From the foregoing, it will be appreciated that specific embodiments of the cloud migration system have been described herein for purposes of illustration, but that various modifications may be made without deviating from the spirit and scope of the invention. Accordingly, the invention is not limited except as by the appended claims.

We claim:

1. A computer-implemented method to migrate application load from a data center to a separate target location, the method comprising:

monitoring an application running on one or more computing resources in a datacenter to determine an ongoing application load;

determining based on monitoring that a threshold for migrating the application to another computing resource has been reached;

identifying a target computing resource to which to migrate at least some of the running application's load;

identifying one or more applications to migrate; and migrating at least some application load of the identified applications to the identified target computing resource in a datacenter remote from the datacenter hosting the one or more computing resources, wherein the preceding steps are performed by at least one processor.

2. The method of claim 1 wherein monitoring the application comprises measuring one or more indications of performance of the application available from the application or an operating system.

3. The method of claim 1 wherein determining that the threshold has been reached comprises a threshold set by an administrator during a previously completed planning phase.

4. The method of claim 1 wherein determining that the threshold has been reached comprises a threshold that includes a metric tied to at least one of processor usage, memory usage, client requests per second, network usage, and storage usage.

5. The method of claim 1 wherein determining that the threshold has been reached comprises a threshold that is met before capacity is fully exhausted to begin migration of application load to another resource with enough time to move the load before any client requests fail.

6. The method of claim 1 wherein determining that the threshold has been reached comprises determining that a failure has occurred in the source datacenter and performing disaster recovery to move application loads affected by the failure to the target computing resource.

7. The method of claim 1 wherein identifying the target comprises accessing information describing a designated target resource during a planning phase by an administrator.

8. The method of claim 1 wherein identifying the target comprises dynamically determining a target based on one or more possible target locations to which to migrate the load.

9. The method of claim 1 wherein identifying the target comprises dynamically determining a target based on any of a time of day, a geographic location, and a cost of using resources at one or more target computing resources.

10. The method of claim 1 wherein identifying applications to migrate comprises determining data usage of one or more applications and determining which applications can be moved with a least burden of data replication to the target location.

11. The method of claim 1 wherein migrating application load comprises setting up network connectivity between the datacenter and target computing resource and moving an instance of the application to the target computing resources.

12. The method of claim 1 further comprising notifying an administrator describing the reached threshold and one or more actions taken to migrate application load.

13. A computer system for cross-cloud computing for capacity management and disaster recovery, the system comprising:

a processor and memory configured to execute software instructions embodied within the following components;

a planning component that provides a tool through which an administrator defines one or more conditions for migrating application load to at least one cloud-based computing resource;

an administrative interface component that provides an administrative interface to the system through which an administrator can access tools and configuration settings;

a movement data store that stores information describing received conditions for migrating application load to the cloud-based computing resource;

a load monitoring component that monitors performance in a datacenter and informs other components when a load is approaching a received condition for migration to another resource;

a movement logic component that carries out the received conditions for migrating an application load;

a load migration component that performs the movement of application loads from one resource to another; and a disaster recovery component that detects failure of one or more resources and invokes the load migration component to move loads from the failed resources to one or more new resources.

14. The system of claim 13 wherein the planning component includes a capacity management tool through which an administrator can specify a threshold load at which migration occurs.

15. The system of claim 13 wherein the planning component includes a capacity management tool through which an administrator can specify a location or resources to which migration occurs.

16. The system of claim 13 wherein the planning component includes a capacity management tool through which an administrator can specify portions of the application to include in or exclude from a migration.

17. The system of claim 13 wherein the movement logic component receives notification from the load monitoring component that specifies current system load and uses this information to determine when a migration will occur.

18. The system of claim 13 wherein the movement logic component monitors the migration and performs testing of networking connections that are setup for communication between the datacenter and cloud-based resources.

19. The system of claim 13 wherein the movement logic component monitors the load to determine when cloud-based resources are no longer needed due to the load subsiding, and requests for the administrator to authorize a migration back from the cloud-based resources to the datacenter.

20. A computer-readable storage medium comprising instructions for controlling a computer system to receive planning information for a subsequent load migration, wherein the instructions, upon execution, cause a processor to perform actions comprising:

displaying a planning tool through which an administrator can provide application information that defines one or more conditions for moving an application load from a source datacenter computing resource to a target datacenter computing resource;

receiving application information that describes one or more applications that are currently executed on the source computing resource and can be relocated wholly or partly to the target computing resource;

determining one or more capacity metrics of the source datacenter computing resource that determine a quantity of application load the datacenter can successfully handle;

receiving one or more load thresholds that indicate a load at which application load migration will automatically occur;

receiving an identification of one or more target computing resources to utilize to offload excess application load upon reaching the received load thresholds; and storing application migration instructions that include the received load threshold and one or more identified target datacenter computing resources to which to migrate application load upon reaching the threshold.

* * * * *